(12) United States Patent
Dobashi

(10) Patent No.: US 8,007,575 B2
(45) Date of Patent: Aug. 30, 2011

(54) AIR FILTERING APPARATUS HAVING MECHANISM FOR DETECTING WATER EXCHANGE TIMING

(75) Inventor: Mitsuhiro Dobashi, Saitama (JP)

(73) Assignee: Sanyo Electric Co., Ltd., Moriguchi-shi (JP)

( * ) Notice: Subject to any disclaimer, the term of this patent is extended or adjusted under 35 U.S.C. 154(b) by 363 days.

(21) Appl. No.: 11/860,908

(22) Filed: Sep. 25, 2007

(65) Prior Publication Data

US 2008/0072758 A1    Mar. 27, 2008

(30) Foreign Application Priority Data

Sep. 26, 2006 (JP) ................................. 2006-261303

(51) Int. Cl.
*B01D 47/00* (2006.01)
(52) U.S. Cl. ............... 96/234; 96/244; 96/262; 96/265; 96/297
(58) Field of Classification Search ............ 96/243, 96/244, 234, 236, 262, 265, 296, 297, 290
See application file for complete search history.

(56) References Cited

U.S. PATENT DOCUMENTS

| 4,255,361 A | 3/1981 | Goettl | |
|---|---|---|---|
| 2001/0004962 A1* | 6/2001 | Hirota et al. | 204/228.1 |
| 2005/0072308 A1* | 4/2005 | Aoyagi | 96/235 |

FOREIGN PATENT DOCUMENTS

| EP | 1496314 | | 1/2005 |
|---|---|---|---|
| JP | 2000-296173 | A | 10/2000 |
| JP | 2002-181358 | A | 6/2002 |
| JP | 2002-295871 | A | 10/2002 |

OTHER PUBLICATIONS

Japanese Office Action issued Feb. 10, 2011 for related Japanese Application No. 2006-261303.

\* cited by examiner

*Primary Examiner* — Duane Smith
*Assistant Examiner* — Tiffany N Palmer
(74) *Attorney, Agent, or Firm* — Westerman, Hattori, Daniels & Adrian, LLP

(57) ABSTRACT

An air filtering apparatus for electrolyzing water to generate electrolytic water containing active oxygen species and filtering air by using the electrolytic water, including an air filtering unit having a gas-liquid contact member to which the electrolytic water containing the active oxygen species is circulatively supplied so as to be brought into contact with air, an electrical conductivity detecting unit for detecting the electrical conductivity of water in the air filtering unit, and a water exchange judging unit for judging on the basis of the detected electrical conductivity whether water exchange is necessary or not.

3 Claims, 10 Drawing Sheets

AIR FILTERING APPARATUS HAVING MECHANISM FOR DETECTING WATER EXCHANGE TIMING

INCORPORATION BY REFERENCE

The present application claims priority under 35 U.S.C. §119 to Japanese Patent Application No. 2006-261303 filed on Sep. 26, 2006. The content of the application is incorporated herein by reference in its entirety.

BACKGROUND OF THE INVENTION

1. Field of the Invention

The present invention relates to an air filtering apparatus that can remove microorganisms floating in the air such as bacteria, virus, fungus, etc. (hereinafter merely referred to as "virus, etc."), and more particularly to an air filtering apparatus having a mechanism for detecting water exchange timing.

2. Description of the Related Art

There has been proposed a filtering apparatus in which tap water is electrolyzed to generate electrolytic water containing active oxygen species such as hypochlorous acid or the like, and virus, etc. floating in the air are removed by using this electrolytic water (for example, see JP-A-2002-181358). According to this filtering apparatus, electrolytic water is supplied to a humidifying element formed of non-woven cloth or the like, and virus, etc. in the air are brought into contact with the electrolytic water in the humidifying element to inactivate the virus, etc., thereby filtering the air.

In the filtering apparatus described above, a part of the electrolytic water supplied to the humidifying element is vaporized and the remaining electrolytic water is drained. Therefore, in order to effectively use electrolytic water, the applicant of this application has proposed an air filtering apparatus utilizing circulation of electrolytic water. According to this air filtering apparatus, it is possible not only to effectively use electrolytic water, but also to reduce the running cost by suppressing water consumption.

When electrolytic water is circulatively used for a long term, the electrolytic water is polluted and this pollution causes reduction in electrolysis performance, so that the air filtering performance itself is reduced. In order to solve this problem, it may be considered that water exchange is periodically carried out every time a predetermined time elapses. However, the pollution degree of electrolytic water is varied in accordance with not only the circulation time of the electrolytic water, but also the environment under which the air filtering apparatus is set. Accordingly, it is difficult to accurately control the timing of water exchange on the basis of the circulation time.

SUMMARY OF THE INVENTION

An object of the present invention is to provide an air filtering apparatus that can accurately control the timing of water exchange when electrolytic water is used while circulated.

In order to attain the above object, according to the present invention, an air filtering apparatus for electrolyzing water to generate electrolytic water containing active oxygen species and filtering air by using the electrolytic water, comprises:

an air filtering unit having a gas-liquid contact member to which the electrolytic water containing the active oxygen species is circulatively supplied so as to be brought into contact with air;

an electrical conductivity detecting unit for detecting the electrical conductivity of water in the air filtering unit; and a water exchange judging unit for judging on the basis of the detected electrical conductivity whether water exchange is necessary or not.

According to the present invention, it is judged on the basis of the electrical conductivity of water whether the water exchange is necessary or not, and thus the water exchange timing can be more accurately controlled. Accordingly, for example, by exchanging water on the basis of this timing, the electrolysis performance in the air filtering unit can be kept. Accordingly, the concentration of the active oxygen species contained in the electrolytic water circulated in the air filtering unit can be kept to a predetermined concentration, and thus the air filtering performance can be kept.

In this case, the air filtering apparatus described above is preferably further equipped with an equipment abnormality judging unit for measuring the frequency of the water exchange judgment of the water exchange judging unit, and judging equipment abnormality of the air filtering unit when the frequency of the water exchange judgment at a predetermined time is equal to a predetermined frequency or more.

Furthermore, the air filtering apparatus described above may be further equipped with a drain pipe for discharging water in the air filtering unit to the external, a drain valve for opening/closing the drain pipe and a drain valve controller for controlling the drain valve on the basis of the judgment result of the water exchange judging unit.

Still furthermore, the air filtering apparatus described above may be further equipped with an operating unit for operating the drain valve.

According to the present invention, it is judged on the basis of the electrical conductivity whether water exchange is necessary or not. Therefore, when the electrolytic water is used while circulated, the water exchange timing can be more accurately controlled.

DETAILED DESCRIPTION OF THE PREFERRED EMBODIMENTS

Preferred embodiments according to the present invention will be described hereunder with reference to the accompanying drawings.

Figure 1:
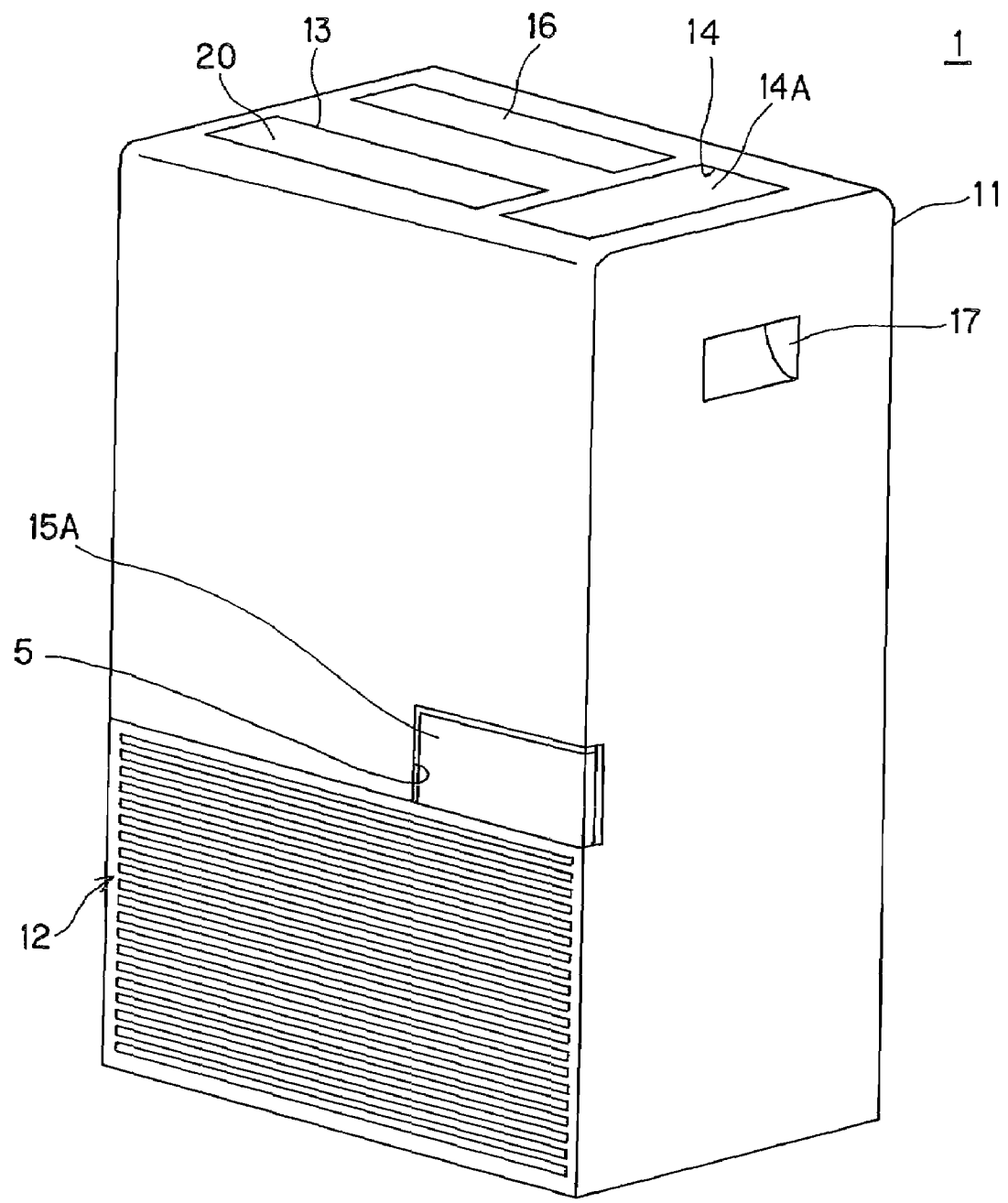
FIG. 1 is a perspective view showing the outlook of an air filtering apparatus according to an embodiment of the present invention.

FIG. 1 is a perspective view showing the outlook of an air filtering apparatus 1 according to an embodiment to which the present invention is applied.

As shown in FIG. 1, the air filtering apparatus 1 has a vertically long box-shaped housing 11, and it is set on the floor, for example. An suction grille 12 is provided to the lower portion of the front face of the housing 11, and an air blow-out port 13 as an exhaust port is provided to the top face of the housing 11. A louver 20 for changing the air blowing direction of air is provided to the air blow-out port 13.

The air filtering apparatus 1 sucks and filters air through the suction grille 12 from a room where the air filtering apparatus is set, and blowing out the filtered air from the air blow-out port 13 into the room, thereby cleaning the indoor air.

The top face of the housing 11 is equipped with an operation panel 16 for carrying out various kinds of operations of the air filtering apparatus 1, and a water supply tank take-out port 14 through which a water supply tank 41 (FIG. 2) described later is inserted or taken out. An openable and closable lid 14A is secured to the water supply tank take-out port 14. Furthermore, the front face of the housing 11 is equipped with a drain receiver take-out port 15 through which a drain receiver 57 (FIG. 2) described later is inserted and taken out, and an openable and closable lid 15A is secured to the drain receiver take-out port 15.

A grip portion 17 is formed at each of the upper portions of both the side faces of the housing 11. These grip portions 17 are recess portions (handholds) on which user's hands put when the housing 11 is lifted by hands. Accordingly, a user can lift and move the air filtering apparatus by himself/herself while carrying the air filtering apparatus.

Next, the internal construction of the air filtering apparatus 1 according to this embodiment will be described with reference to FIGS. 2 to 6

Figure 2:
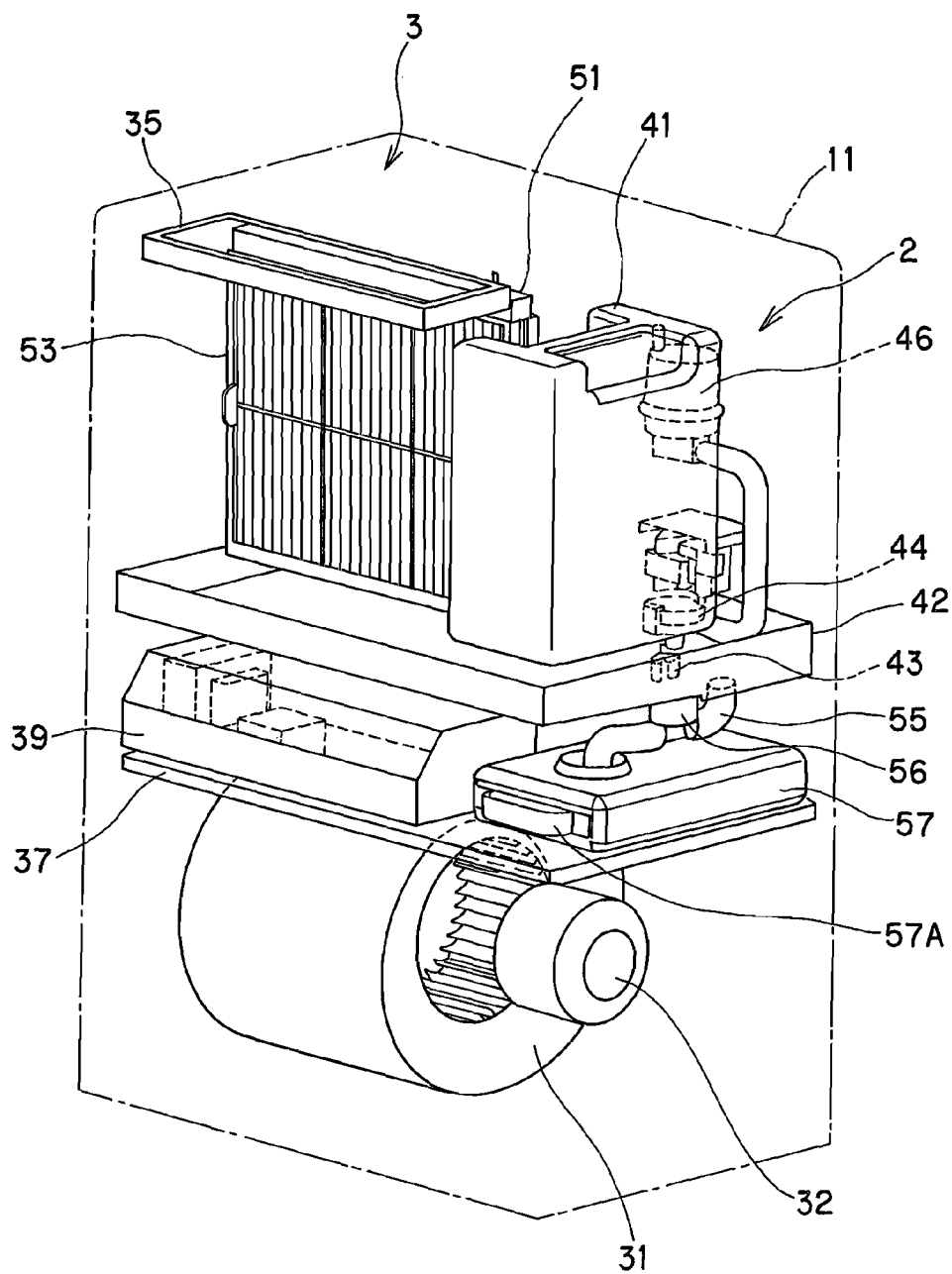
FIG. 2 is a perspective view showing the internal construction of the air filtering apparatus.
Figure 3:
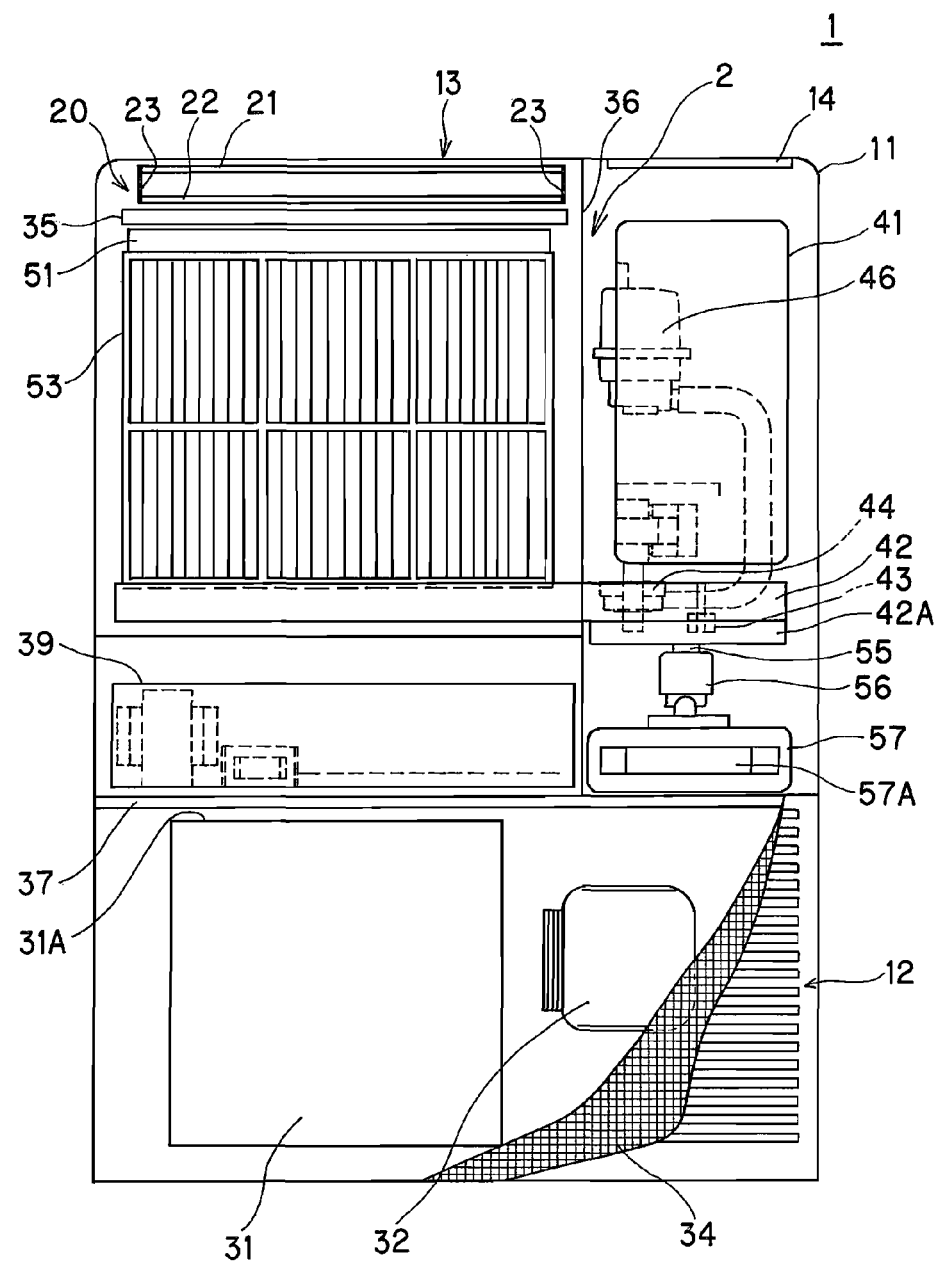
FIG. 3 is a partially fracture front view showing the internal construction of the air filtering apparatus.
Figure 4:
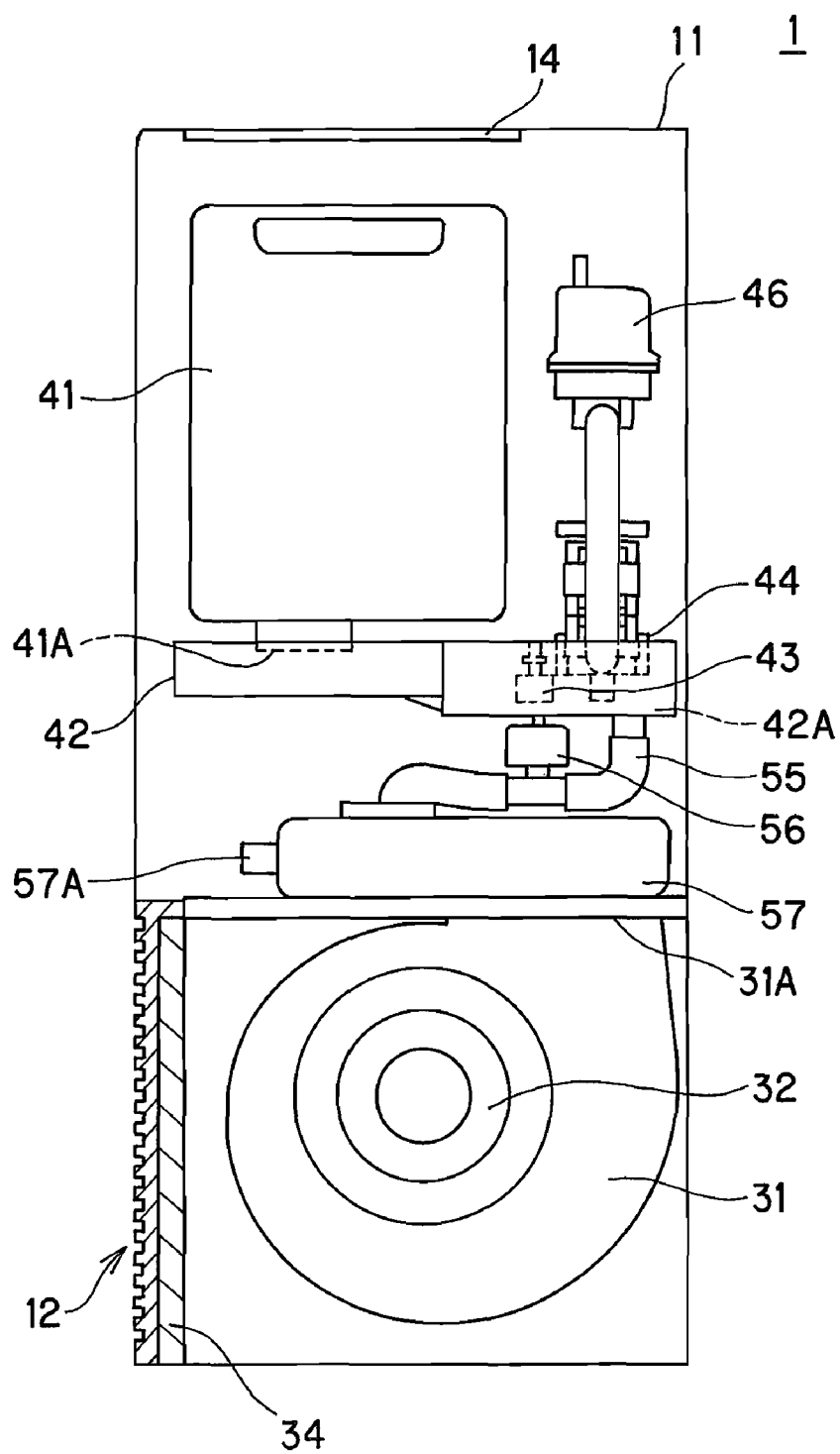
FIG. 4 is a left-side sectional view showing the internal construction of the air filtering apparatus.
Figure 5:
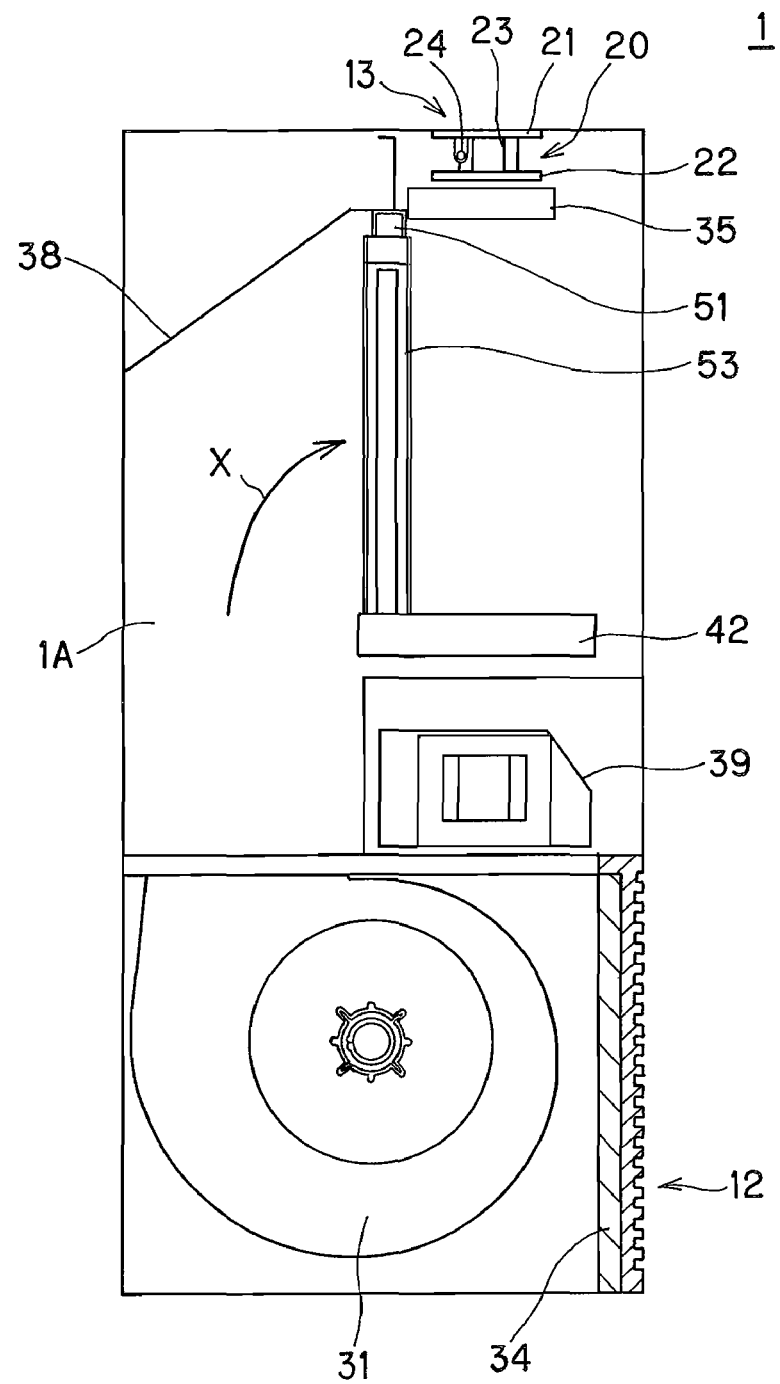
FIG. 5 is a right-side sectional view showing the internal construction of the air filtering apparatus.
Figure 6:
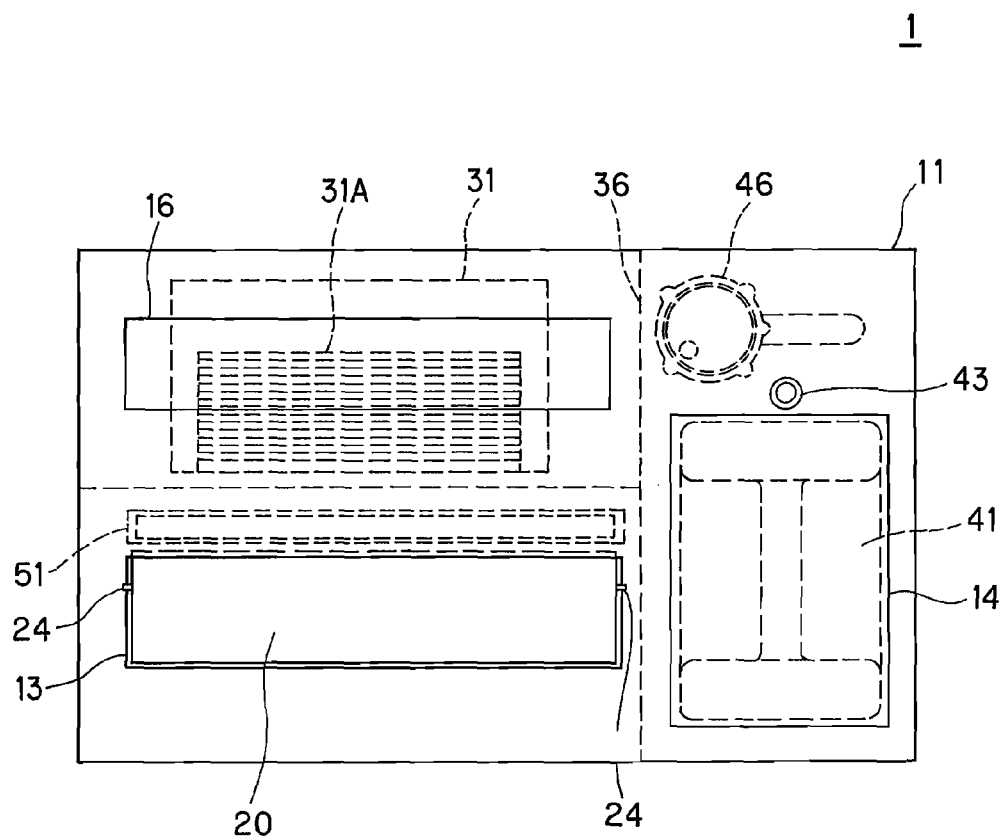
FIG. 6 is a top view showing the internal construction of the air filtering apparatus.

FIG. 2 is a perspective view showing the internal construction of the air filtering apparatus 1. In FIG. 2, the outline of the housing 11 is illustrated by virtual lines for reference. FIG. 3 is a partially fracture front view showing the construction of the air filtering apparatus 1, FIG. 4 is a left-side sectional view, FIG. 5 is a right-side sectional view and FIG. 6 is a top view.

The inside of the housing 11 is partitioned vertically into upper and lower chambers by a support plate 37. An air blowing fan 31 and a fan motor 32 are accommodated in the lower chamber. The air blowing fan 31 is driven by the fan motor 32 to suck indoor air through the suction grille 12 and blow out the air from the air flow-out port 31A. The air flow-out port 31A of the air blowing fan 31 is at the back side portion of the housing 11 so as to be placed face up, and an opening is formed in the support plate 37 so as to be overlapped with the air flow-out port 31A. The opening of the support plate 37 intercommunicates with the space 1A extending vertically at the back side of the housing 11. An air guide plate 38 which is tilted to the front side of the housing 11 is disposed at the upper portion of the space 1a as shown in FIG. 5, and the front end of the air guide plate 38 is brought into contact with the upper end of a water spray box 51 described later.

Therefore, air blown out from the air flow-out port 31A of the air blowing fan 31 passes through the space 1A as indicated by an arrow X in FIG. 5, and blows to the back side of a gas-liquid contact member 53 described later.

Furthermore, a pre-filter 34 is disposed in the housing 11 so as to be overlaid on the back side of the suction grille 12. The pre-filter 34 is a filter for collecting materials (foreign materials such as dust, grass pollen, etc.) of 10 μm or more in particle diameter, for examples. Foreign materials such as dust, grass pollen, etc. are removed by the pre-filter 34, and air from which these foreign materials are removed is sucked by the air blowing fan 31.

An electrical component box 39 and an electrolytic water circulating unit 2 are disposed on the support plate 37. In the electrical component box 39 are accommodated various kinds of electrical components such as a control board (not shown) on which various kinds of devices constituting a controller 60 described later are mounted, a power supply circuit for supplying a power supply voltage to the fan motor 32, etc.

The electrolytic water circulating unit 2 comprises a water receiving tray 42, a water receiving tray float switch 43, a circulating pump 44, an electrolytic bath 46, a water spray box 51 and the gas-liquid contact member 53. The water receiving tray 42 is located above the electrical component box 39, and receives water dropped form the gas-liquid contact member 53. Accordingly, the water receiving tray 42 has a depth to stock a predetermined amount of water. One end portion of the water receiving tray 42 is designed to have a bottom deeper than the other portion, and it serves as a stock portion 42A. The water receiving tray float switch 43 for detecting the water level is disposed at the stock portion 42A. The water receiving tray float switch 43 is turned on when the water level of the stock portion 42A is lower than a predetermined water level.

The water supply tank 41 is disposed above the stock portion 42A, and it is designed so as to supply water from the water supply tank 41 to the stock portion 42A. In detail, a float valve (not shown) is provided to a water supply port 41A formed at the lower end of the water supply tank 41. When the water level of the stock portion 42A is lower than the water supply port 41A, the float valve is opened, so that a required amount of water is supplied form the water supply tank 41 so that the water level of the stock portion 42A is kept constant.

The circulating pump 44 is disposed above the stock portion 42A. The circulating pump 44 operates according to the control of the controller 60 (FIG. 8) to pump up water stocked in the stock portion 42A and feed the water to the electrolytic bath 46. This electrolytic bath 46 contains plural electrodes described later, and a voltage supplied from the controller 60 (FIG. 8) is applied between the electrodes to electrolyze water, thereby generating electrolytic water containing active oxygen species. The electrolytic water generated in the electrolytic bath 46 is pushed out by water which is drained by the circulating pump 44, and supplied to the water spray box 51.

The water spray box 51 is a tubular member assembled to the upper portion of the gas-liquid contact member 53. Plural water spray holes (not shown) are formed at the lower surface of the water spray box 51, and electrolytic water is dropped form the water spray holes to the gas-liquid contact member 53. The gas-liquid contact member 53 is a substantially planar member infiltrated with electrolytic water dropped from the water spray box 51, and it is disposed above the water receiving tray 52 together with the water spray box 51. As shown in detail in FIG. 5, the gas-liquid contact member 53 is substantially vertically erected, and the lower end thereof intrudes into the water receiving tray 42. Furthermore, the water spray box 51 assembled to the upper portion of the gas-liquid contact member 53 is brought into contact with the tip of the air guide plate 38. Therefore, the air passed through the space 1A by the air blowing fan 31 is guided to the gas-liquid contact member 53 side by the air guide plate 38, and passes through the gas-liquid contact member 53.

The gas-liquid contact member 53 is a filter member having a honeycomb structure. In details, the gas-liquid contact member 53 has the structure that an element portion which is brought into contact with gas is supported by a frame. The element portion is constructed by laminating corrugated-plate type corrugated members and flat-plate type planar members, and many openings having substantially triangular shapes are formed among these corrugated members and the planar members. Accordingly, the gas-liquid contact member 532 has the structure in which a large gas contact area can be secured when gas is passed through the element portion, electrolytic water can be dropped and also clogging occurs hardly.

Furthermore, a water distributing sheet (not shown) is provided to the gas-liquid contact member 53 in order to efficiently disperse electrolytic water dropped from the water spray box 51 into the element portion. The water distributing sheet is a sheet (woven fabric, non-woven cloth or the like) formed of textile material having liquid permeability, and one or plural water distributing sheets are provided along the cross-section taken along the thickness direction of the gas-liquid contact member 53.

Furthermore, the gas-liquid contact member 53 and the water supply tank 41 are insulated from each other by a partition plate 36. The partition plate 36 blocks off the space 1A and the side of the gas-liquid contact member 53, and makes air smoothly pass through the gas-contact member 53.

Here, the respective parts of the gas-liquid contact member 53 (containing the frame, the element portion and the water distributing sheet) are formed of materials which are little deteriorated by electrolytic water, such as polyolefin-based resin (polyethylene resin, polypropylene resin or the like), PET (polyethylene terephthalate) resin, vinyl chloride resin, fluorocarbon resin (PTFE, PFA, ETFE or the like), ceramic material or the like. In this embodiment, PET resin is assumed to be used.

Furthermore, the respective parts of the gas-liquid contact member 53 is subjected to a hydrophilic treatment to enhance the affinity to electrolytic water. Accordingly, water retentivity (wettability) of electrolytic water of the gas-liquid contact member 53 is kept, and the contact between active oxygen species (active oxygen materials) described later and indoor air can be kept for a long time. Furthermore, electrolytic water having a mildewproof action is dropped to the gas-liquid contact member 53, so that breeding of fungus, etc. can be avoided without taking any mildewproof action to the gas-liquid contact member 53.

Air passing through the gas-liquid contact member 53 is exhausted through an air blow-out filter 35 disposed below the air blow-out port 13. The air blow-out filter 35 is a filter for preventing invasion of foreign materials from the air blow-out port 13 into the housing 11. The air blow-out port filter 35 has a net, woven fabric, non-woven cloth or the like (not shown), and these materials are formed of synthetic resin, and preferably formed of the material constituting the gas-liquid contact member 53. The air blow-out filter 35 is preferably of moderately loose texture so that the air flowing resistance of air passing through the gas-liquid contact member 53 is not remarkably increased.

As described above, the louver 20 is disposed at the air blow-out port 13, and it is constructed by an upper plate 21 having a size at which the air blow-out port 13 can be closed, a lower plate 22 disposed in parallel to the upper plate 21 at the lower side of the upper plate 21, and joint portions 23 for joining the upper plate 21 and the lower plate 22. The joint portions 23 are plate-shaped members provided to the right and left end portions of each of the upper plate 21 and the lower plate 22, and a pin 24 is erected from each of the joint portions 23. These two pins 24 are projected from both the side ends of the louver 20 to the housing 11 side, and fitted to receivers (not shown) provided at the sides of the air blow-out port 13 to support the louver 20.

Figure 8:
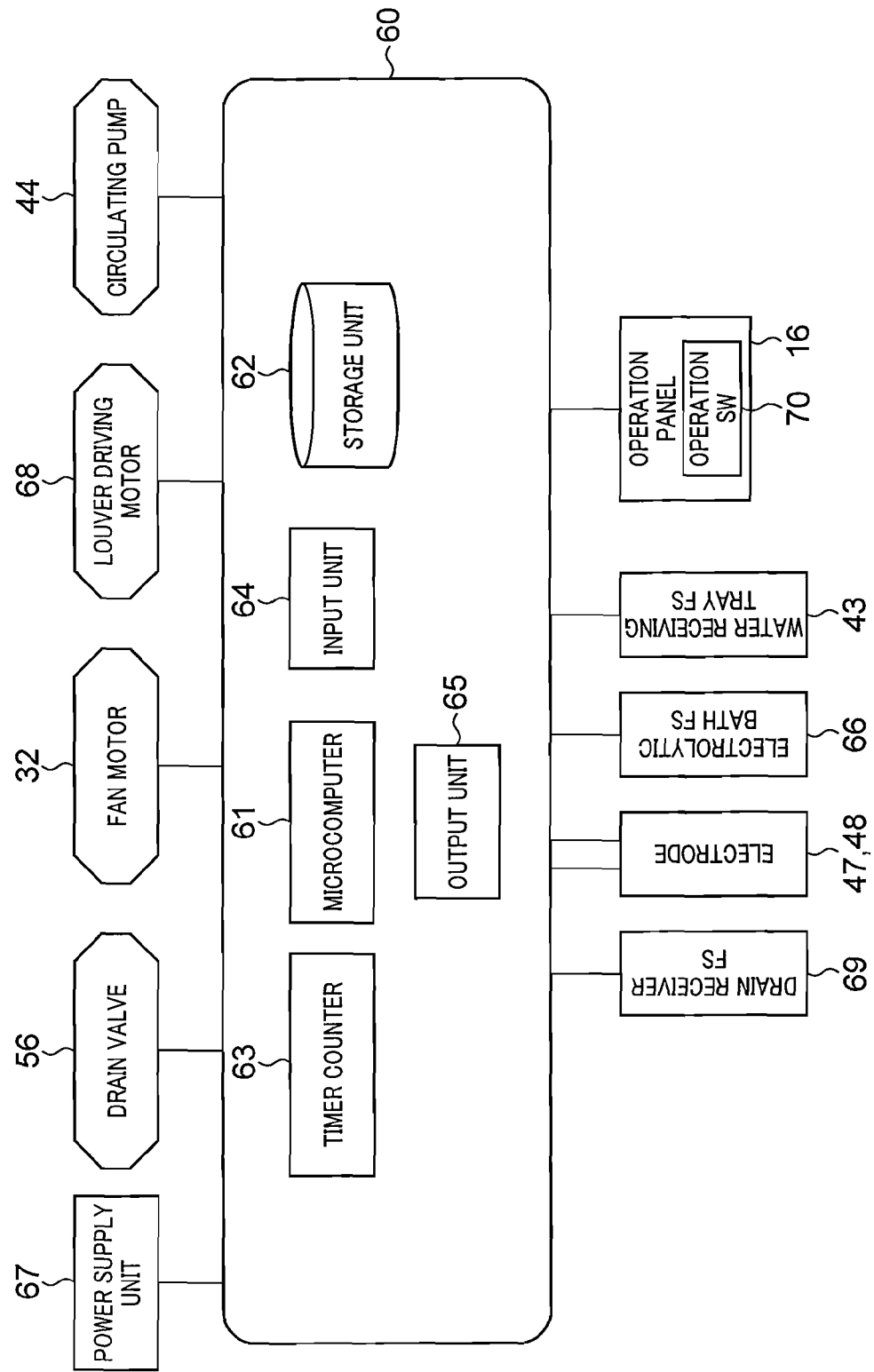
FIG. 8 is a functional block diagram showing the construction of a control system of the air filtering apparatus.

The two pins 24 are freely rotatably supported at the receivers, and joined to a louver driving motor 68 (see FIG. 8). The pins 24 are driven by the louver driving motor 68 and the louver 20 is turned in connection with the driving of the pins 24.

Under the state that the louver 20 is substantially in parallel to the upper face of the housing 11, the air blow-out port 13 is substantially closed by the upper plate 21. This state will be referred as "close state" of the louver 20. On the other hand, the state that the louver 20 is tilted with respected to the upper face of the housing 11 will be referred to as "open state".

Under the open state of the louver 20, air passing through the gas-liquid contact member 53 can be discharged from the air blow-out port 13. Here, the air discharged from the air blow-out port 13 is discharged along the upper plate 21 and the lower plate 22 of the louver 20. Therefore, by changing the tilt angle of the louver 20, the air discharging direction of the air filtering apparatus 1 can be adjusted. Furthermore, the louver 20 has a two-vane structure in which the upper plate 21 and the lower plate 22 are arranged in parallel to each other so as to be spaced from each other at a predetermined interval, so that the louver 20 has an action of rectifying the air blown out from the air blow-out port 13. Accordingly, there is an advantage that air can be smoothly discharged in conformity to the tilt angle of the louver 20.

Figure 7A:
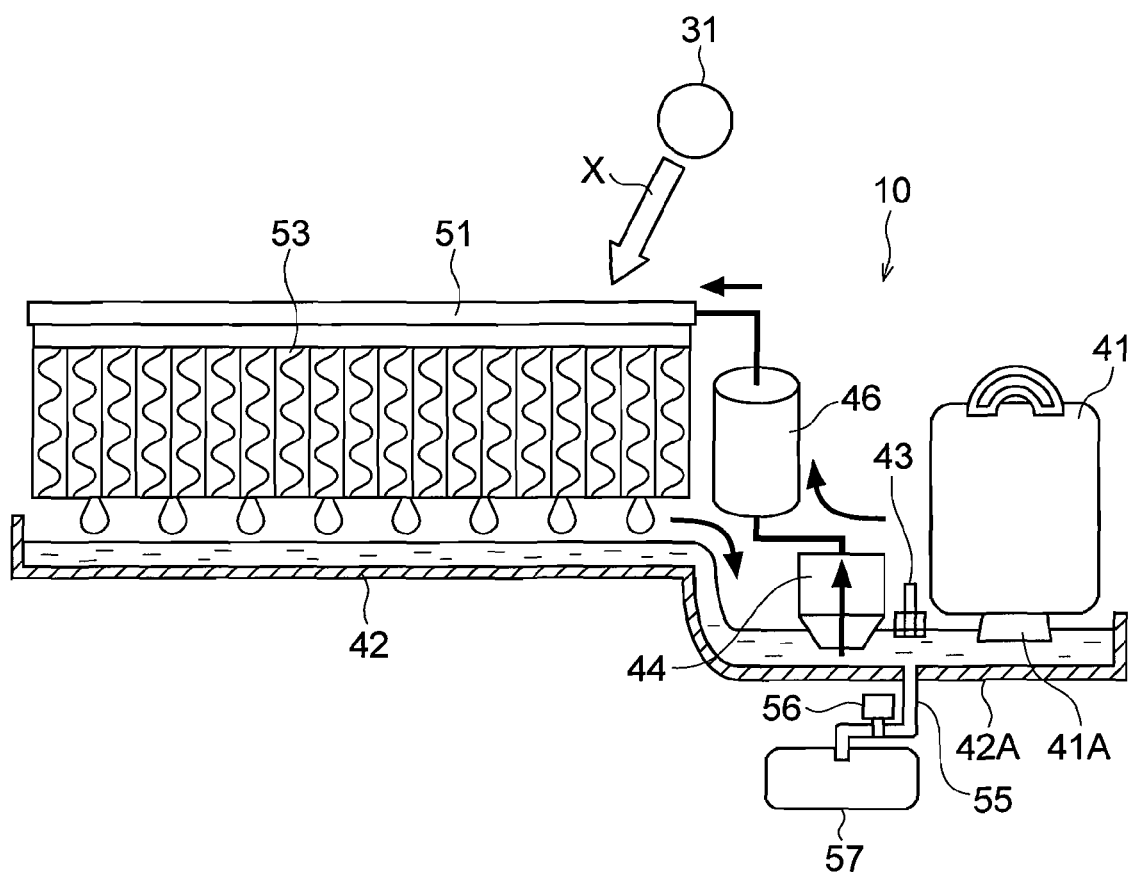
FIG. 7A is a diagram showing the construction of an electrolytic water circulating unit.
Figure 7B:
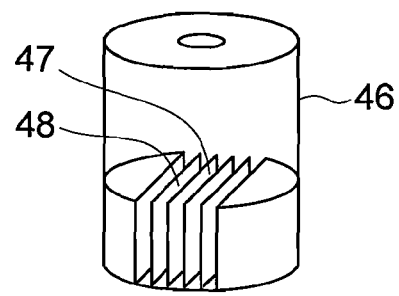
FIG. 7B is a diagram showing the construction of an electrolytic bath.

FIGS. 7A and 7B are diagrams showing the aspect of supplying electrolytic water, wherein FIG. 7A is a diagram showing the construction of the electrolytic water circulating unit 2, and FIG. 7B is a diagram showing the detailed construction of the electrolytic bath 46.

The supply of the electrolytic water to the gas-liquid contact member 53 will be described with reference to FIGS. 7A and 7B. In this embodiment, a case where tap water is filled in the water supply tank 41 and the air filtering apparatus 1 is operated will be described.

When the water supply tank 41 filled with tap water is set in the air filtering apparatus 1, the tap water is supplied form the water supply tank 41 to the water receiving tray 42 as described above, and the water level of the water receiving tray 42 reaches a predetermined level. Water in the water receiving tray 42 is pumped by the circulating pump 44, and supplied to the electrolytic bath 46. As shown in FIG. 7B, the electrolytic bath 46 is equipped with at least one pair of positive and negative electrodes 47 and 48, and by applying a voltage between the electrodes 47 and 48, tap water supplied to the electrolytic bath 46 is electrolyzed and electrolytic water containing active oxygen species is generated. Here, the active oxygen species is oxygen having higher oxidizing activity than normal oxygen and relevant materials thereto, and contain not only so-called narrowly-defined active oxygen such as superoxide anion, singlet oxygen, hydroxyl radical and hydrogen peroxide, but also so-called broadly-defined active oxygen such as ozone, hypochlorous acid, hypohalous acid, etc. The electrolytic bath 46 is disposed in proximity to the gas-liquid contact member 53, and thus the active oxygen species generated by electrolyzing tap water can be immediately supplied to the gas-liquid contact member 53.

The electrodes 47, 48 are constructed by two electrode plates each of which comprises a base of Ti (titan) and a coated layer of Ir (iridium), Pt (platinum). The current value flowing in the electrodes 47, 48 is set so that the current density is equal to several mA (milliampere)/cm$^2$ (square centimeter) to several tens MA/cm$^2$, and a predetermined free residual chlorine concentration (for example, 1 mg(milligram)/l (liter) occurs.

More specifically, by supplying current to tap water through the electrodes 47, 48, the following reaction occurs at the cathode:

$$4H^+ + 4e^- + (4OH^-) \rightarrow 2H_2 + (4OH^-)$$

Furthermore, the following reaction occurs at the anode:

$$2H_2O \rightarrow 4H^+ + O_2 + 4e^-$$

At the same time, chlorine ions contained water (chlorine ions are added in tap water in advance) reacts as follows:

$$2Cl^- \rightarrow Cl_2 + 2e^-$$

Furthermore, $Cl_2$ thus generated reacts with water as follows:

$$Cl_2 + H_2O \rightarrow HClO + HCl$$

That is, hypochlorous acid (HClO) and hydrogen chloride (HCl) occur.

The concentration of the active oxygen species in the electrolytic water is adjusted so that virus, etc. to be filtered are inactivated. The adjustment of the concentration of the active oxygen species is performed by adjusting the voltage applied between the electrodes 47, 48 to adjust the value of current to flow between the electrodes 47, 48. Specifically, by changing the voltage applied between the electrodes 47, 48 to increase the current value, the concentration of hypochlorous acid in the electrolytic water can be increased.

Hypochlorous acid occurring at the anode is contained in the broadly-defined active oxygen species and has strong oxidizing action and a bleaching action. Water solution in which hypochlorous acid is dissolved, that is, electrolytic water generated in the air filtering apparatus 1 exercises various kinds of air cleaning effects such as inactivation of virus, etc., sterilization, decomposition of organic compounds, etc. When electrolytic water containing hypochlorous acid is dropped from the water spray box 51 to the gas-liquid contact member 53, air blown out from the air blowing fan 31 is brought into contact with hypochlorous acid in the gas-liquid contact member 53. Accordingly, virus, etc. floating in the air are inactivated, and also odor materials contained in the air concerned react with hypochlorous acid to be decomposed or ionized, so that the order materials are dissolved in the water. Accordingly, air filtering and deodorization are performed, and cleaned air is discharged from the gas-liquid contact member 53. In this construction, the water receiving tray 42, the circulating pump 44, the electrolytic bath 46, the gas-liquid contact member 53 and the air blowing fan 31 constitute an air filtering mechanism (air filtering unit) 10 for performing air filtering and deodorization.

An inactivating mechanism of virus, etc. by the active oxygen species will be described by exemplifying influenza virus. The active oxygen species functions to break down and vanish (remove) the surface protein (spike) of the virus concerned which is indispensable for infection. When the surface protein of influenza virus is broken down, the influenza virus is not joined to a receptor which is necessary for infection of the virus concerned, so that infection can be prevented. Therefore, influenza virus floating in the air is brought into contact with the electrolytic water containing the active oxygen species in the gas-liquid contact member 53, so that the influenza virus loses so-called infection power, and thus the infection can be prevented.

Accordingly, even when the air filtering apparatus 1 is set in a so-called large space such as a kindergarten, an elementary/junior high/ high school, long-term care insurance facilities, a hospital or the like, air cleaned (sterilized, inactivated, deodorized, etc.) by electrolytic water is enabled to broadly go around in a large space. Therefore, air filtering and deodorization in a large space can be efficiently performed.

Furthermore, the electrolytic water dropped from the water spray box 51 to the gas-liquid contact member 53 moves downwardly along the gas-liquid contact member 53, and finally falls to the water receiving tray 42. The electrolytic water falling to the water receiving tray 42 is pumped by the circulating pump 44 again and supplied through the electrolytic bath 46 to the gas-liquid contact member 53. As described above, according to the construction of this embodiment, the water is supplied in a circulating style, and air can be efficiently filtered for a long time by using a small amount of water effectively. Furthermore, when the amount of water circulated in the electrolytic water circulating unit 2 is reduced due to vaporization or the like, a proper amount of water in the water supply tank 41 is supplied to the water receiving tray 41.

In the air filtering apparatus 1 of this embodiment, water stocked in the water receiving tray 42 can be properly discharged. Specifically, as shown in FIGS. 2 to 7, a tank-like drain receiver 57 which has a predetermined width and is equipped with an opening at the upper portion thereof is disposed below the water stock portion 42A. The drain receiver 57 is mounted on the support plate 37 (FIG. 2), and it can be inserted and taken out into/from the drain receiver take-out port 15 of the housing 11 (FIG. 1). The drain pipe 55 is joined to the stock portion 42A of the water receiving tray 42, and a drain valve 56 for opening/closing the drain pipe 55 is provided to the drain pipe 55. The tip of the drain pipe 55 extends downwardly, and intrudes from the opening of the drain receiver 57 into the drain receiver 57.

The bottom surface of the stock portion 42A is opened at the joint portion to the drain pipe 55 so that water in the stock portion 42A flows out from the open portion, and the drain pipe 55 extends downwardly from the stock portion 42A. Therefore, the drain valve 56 is opened under the control of the controller 60 (FIG. 8), and the water in the water receiving tray 42 passes through the drain pipe 55 and flows to the drain receiver 57. As described above, the drain pipe 55 provided to the water receiving tray is used, and the opening/closing of the drain valve 56 is controlled, whereby water in the air filtering mechanism 10 can be withdrawn/discharged by the drain receiver 57. Furthermore, the drain receiver 57 is provided with a grip portion 57A which can be easily grasped, and thus it can be easily inserted and taken out into/from the drain receiver take-out port 15 (FIG. 1).

FIG. 8 is a functional block diagram showing the construction of the control system of the air filtering apparatus 1.

As shown in FIG. 8, the fan motor 32, the circulating pump 44, the drain valve 56, the louver driving motor 68 for opening/closing the louver 20 and the power supply portion 67 for supplying power to the respective parts are connected to the controller 60, and operated according to the control of the controller 60.

Furthermore, various kinds of switches, indicator lamps, etc. disposed on the operation panel 16 are connected to the controller 60, and also the water receiving tray float switch 43, the electrodes 47, 48, the electrolytic bath float switch 66 for detecting the water level in the electrolytic bath 46 and a drain receiver float switch 69 for detecting the water level in the drain receiver 57 are connected to the controller 60. The drain receiver float switch 69 is turned off when the water level of the drain receiver 57 exceeds a predetermined level.

The controller 60 includes a microcomputer 61 for controlling the whole of the air filtering apparatus 1, a storage unit 62 for storing control programs executed by the microcomputer 61 and data such as control parameters, etc., a timer counter 63 for carrying out a time counting operation on the basis of the control of the microcomputer 61, an input unit 64 for detecting an operation of the operation panel 16 and outputting the operation content to the microcomputer 61, and an output unit 65 for outputting the processing result of the microcomputer 61 by controlling turn-on of the indicator lamps (not shown) of the operation panel 16 or the like.

The microcomputer 61 reads in and executes the control programs stored in the storage unit 62 in advance, and also reads in the control parameters stored in the storage unit 62 to operate the respective parts of the air filtering apparatus 1.

Specifically, when the operation of instructing start of the operation is carried out on the operation panel 16 and the information representing this operation is input from the input unit 64, the microcomputer 61 operates the circulating pump 44 to start the circulation of water, and also applies a voltage between the electrodes 47, 48 to generate electrolytic water. Furthermore, the microcomputer 61 operates the louver driving motor 68 to set the louver 20 to an open state. Thereafter, the microcomputer 61 starts to operate the fan motor 32, thereby starting the air blowing operation of the air blowing fan 31. Through the series of operations described above, the air filtering operation of the air filtering apparatus 1 is started. In connection with the start of the air filtering operation, the microcomputer 61 controls the output unit 65 to display that the air filtering apparatus 1 is under operation.

Furthermore, in connection with the start of the air filtering operation, the microcomputer 61 controls the time counter 63 to start the counting operation of the operation time. The timer counter 63 can accumulatively count the operation time. Accordingly, even after the air filtering apparatus 1 stops the air filtering operation, the timer counter 63 can continue to count the operation time without resetting the count value when the air filtering operation is resumed.

During execution of the air filtering operation, the microcomputer 61 measures the voltage applied between the electrodes 47 and 48 and the current value flowing between the electrodes 47 and 48. Then, the microcomputer 61 monitors the electrical conductivity calculated from the voltage value and the current value, judges the concentration of the electrolytic water (the concentration of the active oxygen species) in the electrolytic bath 46 on the basis of the electrical conductivity, and properly adjusts the voltage to be applied between the electrodes 47 and 48. In this construction, the microcomputer 61 and the electrodes 47 and 48 function as an electrical conductivity detecting unit. Furthermore, during execution of the air filtering operation of the air filtering apparatus 1, when it is detected by the electrolytic bath float switch 66 that the water level in the electrolytic bath 46 is lower than the predetermined water level and also when it is detected by the water receiving tray float switch 43 that the water level of the water receiving tray 42 is lower than the predetermined water level, the microcomputer 61 stops application of the voltage between the electrodes 47 and 48, stops the operation of the circulating pump 44 and the fan motor 32, and also makes the output portion 65 display an alarm.

Furthermore, when the operation of instructing the stop of the operation is carried out on the operation panel 16 and the information representing this operation is input from the input unit 64, the microcomputer 61 stops application of the voltage between the electrodes 47, 48 and also stops the circulating pump 44. Still furthermore, the microcomputer 61 stops the fan motor 32 and the air blowing operation of the air blowing fan 31, and then operates the louver driving motor 68 to set the louver 20 to a close state. Through the series of operations described above, the air filtering operation of the air filtering apparatus 1 is stopped. At the time when the air filtering operation is stopped, the microcomputer 61 controls the output unit 65 to stop the display indicating that the air filtering apparatus 1 is under operation, and also controls the timer counter 63 to stop the time counting operation.

When the electrical conductivity of electrolytic water circulated through the gas-liquid contact member 53 exceeds a predetermined range, the microcomputer 61 executes a water exchange operation processing for draining the water in the water receiving tray 42 to the drain receiver 57.

The operation of the air filtering apparatus 1 will be hereunder described by concentrating on the water exchange operation processing.

Figure 9:
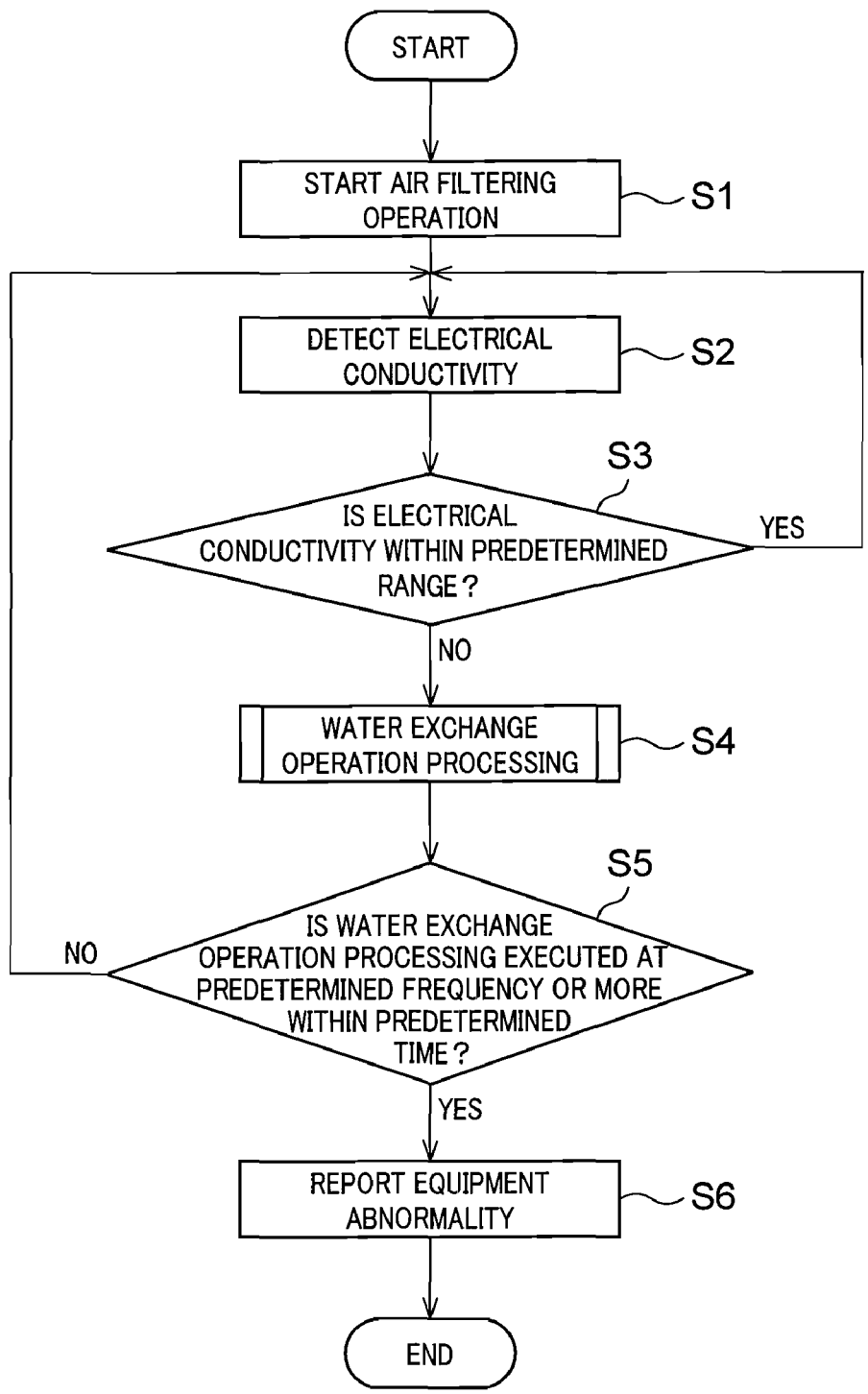
FIG. 9 is a flowchart showing the operation of the air filtering apparatus.

FIG. 9 is a flowchart showing the operation of the air filtering apparatus 1. During execution of the operation shown in FIG. 9, the microcomputer 61 implements the function as a water exchange judging unit and the electrical conductivity detecting unit.

When the start of the operation is instructed by the operation on the operation panel 16, the microcomputer 61 controls the respective parts of the air filtering apparatus 1 as described above, and starts the air filtering operation (step S1). In connection with the start of the air filtering operation, the microcomputer 61 detects the electrical conductivity of water (electrolytic water) circulated in the air filtering mechanism 10 by using the electrodes 47 and 48 (step S2). Specifically, the microcomputer 61 measures the voltage value applied between the electrodes 47 and 48 and the current value actually flowing through the electrodes 47 and 48 by using a voltmeter and ammeter, for example, and calculates the electrical conductivity on the basis of the measured voltage value and current value.

Subsequently, during execution of the air filtering operation, the microcomputer 61 judges on the basis of the detected electrical conductivity whether it is necessary to exchange water (step S3). Specifically, the microcomputer 61 judges whether the detected electrical conductivity is within a preset range.

In general, the electrical conductivity of tap water is equal to several hundreds microsiemens (for example, 200 to 400 $\mu S/cm^2$). If this electrical conductivity is excessively low, chloride ion ($Cl^-$) serving as a standard material when hypochlorous acid is generated lacks, and thus it is impossible to generate electrolytic water containing hypochlorous acid whose concentration is so sufficient that virus, etc. can be inactivated. On the other hand, when the electrical conductivity is excessively high, the rates of ions (for example, sulfate ion ($SO_4^{2-}$), calcium ion ($Ca^{2+}$)) other than chloride ion in electrolytic water are increased, and thus in this case it is also impossible to generate electrolytic water containing hypochlorous acid whose concentration is so sufficient that virus, etc. can be inactivated.

Therefore, in this construction, in order to efficiently generate electrolytic water containing hypochlorous acid whose concentration is so sufficient that virus, etc. can be inactivated, the range of the electrical conductivity of water (electrolytic water) circulated in the air filtering mechanism 10 is set by an experiment or the like. In this embodiment, the range of the electrical conductivity in which the electrolytic water can be efficiently generated is set to 200 to 7000 ($\mu S/cm^2$).

If it is judged that the detected electrical conductivity is within the predetermined range (step S3; Yes), the processing returns to step S2 to monitor the electrical conductivity, and also continues the water exchange judgment. On the other hand, if it is judged that the detected electrical conductivity is not within the predetermined range (step S3; No), the microcomputer 61 judges that it is necessary to exchange water (electrolytic water) circulated in the air filtering apparatus 10, and executes the water exchange operation processing (step S4). The details of the water exchange operation processing will be described later with reference to FIG. 10. When the water exchange operation processing is finished, the microcomputer 61 shifts the processing to step S5.

Subsequently, the microcomputer 61 judges whether the water exchange operation processing is executed within a predetermined time (for example, 10 hours) at a predetermined frequency (for example, three times) or more (step S5). This predetermined time is set to be sufficiently shorter than a water exchange reference time (for example, 250 hours) when the water exchange operation processing is executed on the basis of the operation time, and the microcomputer 61 measures the predetermined time by using the timer counter 63. If the water exchange operation processing is executed at the predetermined frequency or more within the predetermined time because the predetermined time is set to be sufficiently shorter than the water exchange reference time, it would be estimated that water circulated in the air filtering mechanism 10 has no abnormality, but each equipment (for example, electrodes) constituting the air filtering mechanism 10 has abnormality.

In this judgment, if it is judged that the water exchange operation processing is not executed at the predetermined frequency or more within the predetermined time (step S5; No), the microcomputer 61 returns the processing to step S2. If the water processing operation processing is executed at the predetermined frequency or more within the predetermined time (step S5; Yes), the microcomputer 61 judges that equipment abnormality exists in the air filtering mechanism 10 (step S6), and displays this fact on the indicator lamp (not shown) on the operation panel 16. In addition, the microcomputer 61 controls an alarm buzzer provided to the output unit 65 to emit an alarm, thereby reporting the abnormality to a user (step S7). Thereafter, the processing is finished.

Figure 10:
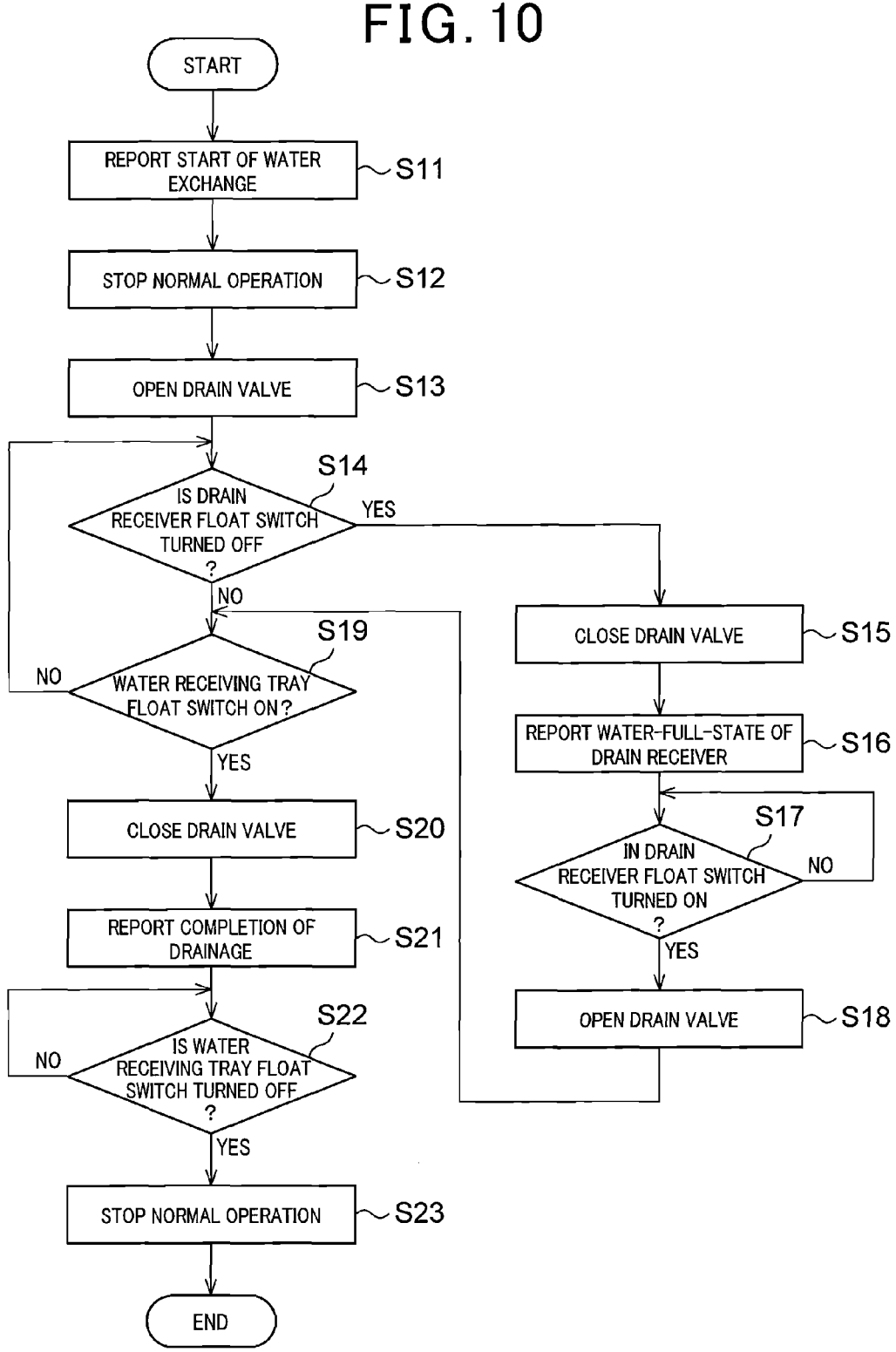
FIG. 10 is a flowchart showing a water exchange operation processing.

FIG. 10 is a flowchart showing the water exchange operation processing shown in step S4 of FIG. 9. In this water exchange operation processing, the microcomputer 61 implements the function as a drain valve control unit for opening the drain valve 56 when there is a drain request.

In connection with the start of the water exchange operation processing, the microcomputer 61 controls the output unit 65 to report the start of the water exchange operation from the indicator lamp or the like (step S11), and stops the normal air filtering operation (step S12). Subsequently, the microcomputer 61 opens the drain valve 56 (step S13), and drains water in the water receiving tray 42 to the drain receiver 57.

After the drain valve 56 is opened, the microcomputer 61 monitors the state of the drain receiver float switch 69 disposed in the drain receiver 57 (step S14). The drain receiver float switch 69 is turned off when the water level of the drain receiver 57 exceeds the predetermined level. When the drain receiver float switch 69 is turned off, the water level of water stocked in the drain receiver 57 exceeds the predetermined level, and thus when the water in the water receiving tray 42 is further drained to the drain receiver 57, water may flow over the drain receiver 57. Therefore, when the drain receiver float switch 69 is turned off (step S14; Yes), the microcomputer 61 closes the drain valve 61 (step S15), and reports to the user that the drain receiver 57 is fully filled with water (i.e., under a full state) (step S16). Subsequently, the microcomputer 61 judges whether the drain receiver float switch 69 is turned on (step S17). That is, the microcomputer 61 monitors whether the user drains water in the drain receiver 57 in response to the report of the step S16. When the drain receiver float switch 69 is turned on (step S17; Yes), the microcomputer 61 judges that the drain receiver 57 becomes vacant, opens the drain valve 61 again (step S18) and shifts the processing to step S19.

On the other hand, if it is judged in step S14 that the drain receiver float switch 69 is turned on, the microcomputer 61 monitors the state of the water receiving float switch 43 disposed in the stock portion 42A (step S19). As described above, when the water level of the stock portion 42A is lower than the predetermined level, the water receiving tray float switch 43 is turned on. Therefore, when the water receiving tray float switch 43 is turned on, the water level of the water receiving tray 42 is lower than the predetermined level, and most of water in the electrolytic water circulating unit 2 is discharged to the drain receiver 57.

Furthermore, when water remains in the water supply tank 41 at the start time of the water exchange operation, the water level of the water receiving tray 42 is not lowered during the time period when water is supplied from the water supply tank 41 in connection with the discharge of water from the water receiving tray 42. Accordingly, when the water receiving tray float switch 43 is turned on, the water in the water supply tank 41 is sufficiently discharged.

When the water receiving tray float switch 43 is turned on (step S19; Yes), the microcomputer 61 closes the drain valve 56 (step S20). Then, the microcomputer 61 controls the output unit 65 to report the completion of the discharge by the indicator lamp of the operation panel 16 or the like, guides the user to supplement water into the water supply tank 41 (step S21), and then monitors the state of the water receiving tray float switch 43 (step S22).

When the water supply tank 41 supplemented with water is set in the air filtering apparatus 1, water is supplied from the water supply tank 41 into the water receiving tray 42, and the water receiving tray float switch 43 is turned off. Therefore, when it is detected that the water receiving tray float switch 43 is turned off (step S22; Yes), the microcomputer 61 starts the normal operation (step S23) and finishes the processing.

As described above, according to this embodiment, the air filtering apparatus 1 is equipped with the air filtering mechanism 10 for electrolyzing water in the electrolytic bath 46 to generate electrolytic water, circulatively supplying the electrolytic water to the gas-liquid contact member 53 by the circulating pump 44, blowing indoor air to the gas-liquid contact member 53 to bring the air into contact with the electrolytic water in the gas-liquid contact member 53, and then blowing out the air to the room. The microcomputer 61 detects the electrical conductivity of water in the air filtering mechanism 10, and judges on the basis of the electrical conductivity whether it is necessary to exchange water. Therefore, the water exchange timing can be more accurately controlled. Accordingly, by carrying out the water exchange at this timing, the electrolysis performance in the electrolytic bath 46 can be kept, and thus the concentration of hypochlorous acid contained in electrolytic water circulated in the air filtering mechanism 10 can be kept to a predetermined concentration, and thus the air filtering performance can be kept.

Furthermore, according to this embodiment, the microcomputer 61 measures the frequency of the water exchange judgment, and judges abnormality of each equipment (for example, the electrodes) constituting the air filtering mechanism 10 when the frequency of the water exchange judgment is equal to a predetermined frequency or more within a predetermined time, and thus each of abnormality of water and abnormality of equipment can be identified with a simple construction.

Still furthermore, according to this embodiment, the drain pipe 55 for draining water in the air filtering mechanism 10 to the outside and the drain valve 56 for opening/closing the drain pipe 55 are provided, and the microcomputer 61 controls the opening/closing operation of the drain valve 56 in accordance with the judgment result of the water exchange judgment, and thus the water exchange can be automatically performed in conformity with the water exchange timing.

The air filtering apparatus 1 of this embodiment is an example, and various modifications may be made without departing from the subject of the present invention.

For example, ozone ($O_3$) or hydrogen peroxide ($H_2O_2$) may be generated as active oxygen species. In this case, when platinum tantalum electrodes are used as the electrodes 47, 48, active oxygen species can be highly efficiently and stably generated from water in which ion species are rare.

At this time, at the anode, the following reaction occurs:

$$2H_2O \rightarrow 4H^+ + O_2 + 4e^-$$

Simultaneously with the above reaction, the following reactions occur, and ozone ($O_3$) is generated.

$$3H_2O \rightarrow O_3 + 6H^+ + 6e^-$$

$$2H_2O \rightarrow O_3 + 4H^+ + 4e^-$$

Furthermore, at the cathode, the following reactions occur:

$$4H^+ + 4e^- + (4OH^-) \rightarrow 2H_2 + (4OH^-)$$

$$O_2^- + e^- + 2H^+ \rightarrow H_2O_2$$

That is, $O_2^-$ generated through the electrode reaction and $H^+$ in solution are bonded to each other to generate hydrogen peroxide ($H_2O_2$).

Furthermore, in the above embodiment, tap water is supplied from the water supply tank 41. Tap water is added with chlorine compound for the purpose of sterilization, and thus it contains chloride ions. Hypochlorous acid and hydrochloric acid are generated through the reaction of chloride ions. This is not limited to the case where tap water is used. Active oxygen species containing halogen can be generated through the same reaction insofar as water contains halide ions by adding or mixing halide to water supplied to the electrolytic bath 46.

Still furthermore, in the above embodiment, the drain pipe 55 for draining electrolytic water on the water receiving tray 42 and the drain valve 56 for opening/closing the drain pipe 55 are provided, and the microcomputer 61 controls the opening/closing operation of the drain valve 56 in accordance with the judgment result of the water exchange judgment. In addition to this, an operation switch 70 (operating unit) which can open/close the drain valve 56 through a user's operation may be equipped. According to this construction, for example when the air filtering apparatus 1 is not used for a long term, this is effective to a case where the user manually drains water in the water receiving tray 42. In this case, if the air filtering apparatus is designed so that an input signal of the operation switch 70 is allowed only when the operation of the air filtering apparatus 1 is stopped, water exchange can be prevented from being erroneously carried out during the operation of the air filtering apparatus 1.

Still furthermore, in the air filtering apparatus 1, the same reaction can be induced even when water containing rare ion species (containing pure water, purified water, well water, some kinds of tap water, etc.) is used. That is, by adding halide (salt or the like) to water containing rare ion species, the same reaction is induced and active oxygen species can be achieved. Furthermore, the above embodiment adopts a water supply system based on the water supply tank 41 which can be freely inserted and taken out. However, in place of use of the water supply tank 41, a water pipe-distributing and supplying system in which a tap water pipe is connected to directly supply city water to the air filtering apparatus 1 may be used.

What is claimed is:

1. An air filtering apparatus for electrolyzing water to generate electrolytic water containing active oxygen specifies and filtering air by using the electrolytic water, comprising:

an electrolytic tank for generating electrolytic water;

a gas-liquid contact member to which electrolytic water from the electrolytic tank is supplied to bring air into contact with the electrolytic water, thereby filtering the air;

a water receiving tray that has a water receiving unit for receiving used electrolytic water discharged from the gas-liquid contact member and a water stock unit which is joined with the water receiving unit, the water stock unit having a deeper bottom than the water receiving unit to stock the used electrolytic water discharged from the gas-liquid contact member;

a circulating pump for circulating the electrolytic water stocked in the water stock unit to the electrolytic tank;

an electrical conductivity detecting unit for detecting the electrical conductivity of the circulated electrolytic water;

a drain pipe that is connected to the water stock unit and discharge the electrolytic water stocked in the water stock unit to the external;

a drain valve that is connected to the drain pipe and discharges the electrolytic water stocked in the water stock unit from the drain pipe to the external by an opening/closing operation thereof; and a controller for controlling the opening/closing operation of the drain valve and opening the drain valve when the electrical conductivity detected by the electrical conductivity detecting unit is out of a predetermined range, thereby discharging the electrolytic water stocked in the water stock unit to the external.

2. The air filtering apparatus according to claim 1, further comprising an equipment abnormality judging unit for measuring the frequency of a drain frequency of the drain valve, and judging equipment abnormality of the air filtering unit when the frequency of the drain frequency at a predetermined time is equal to a predetermined frequency or more.

3. The air filtering apparatus according to claim 1, further comprising an operating unit for operating the drain valve.

* * * * *